Figure 2:
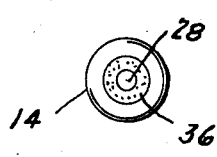

Nov. 17, 1959

C. L. McALISTER 2,913,555

PROTECTORS FOR ELECTRIC CIRCUITS

Filed Aug. 8, 1957

INVENTOR
CRAIG L. McALISTER

BY Ray Eilers ATTY.

United States Patent Office 2,913,555
Patented Nov. 17, 1959

2,913,555
PROTECTORS FOR ELECTRIC CIRCUITS

Craig L. McAlister, Overland, Mo., assignor to McGraw-Edison Company, Chicago, Ill., a corporation of Delaware Application August 8, 1957, Serial No. 676,980

14 Claims. (Cl. 200—123)

This invention relates to improvements in protectors for elecric circuits. More particularly, this invention relates to improvements in a protector for electric circuits that can respond to externally-generated heat and that can respond to electrical overloads.

It is therefore an object of the present invention to provide an improved protector for electric circuits that can respond to externally-generated heat and to electrical overloads.

Henry T. Bussmann Patent No. 2,376,863 which was granted May 29, 1945 for Electric Protective Device shows and describes a protector for electric circuits that can respond to externally-generated heat or to electrical overloads; and that protector has provided valuable protection. When that protector is mounted in a suitable socket on the housing of an electric motor or other electrically-operated device, it permits that motor or other device to operate indefinitely on the rated current of that motor or other device; but it will open the circuit if an unusual condition arises that causes the motor or other device to overheat or to draw current in excess of its rated current for excessive periods of time. Countless numbers of motors and other electrically-operated devices have been protected by the said protector for electric circuits; but there are some specialized electrically-operated devices that can not be protected by the said protector for electric circuits. Specifically, some specialized electrically-operated devices can be injured when they are operated indefinitely on their rated currents; and those devices can not be protected by a protector for electric circuits that permits electrically-operated devices to operate indefinitely on their rated currents. Those specialized electrically-operated devices are designed to operate for short periods of time and are designed to operate at high current levels during those short periods of time. Those devices can be operated safely at those high current levels for those short periods of time, and therefore they are rated to operate at those high current levels. However, since those devices can be injured if they are operated for long periods of time at those high current levels, and since the protector for electric circuits of the said patent permits devices to operate indefinitely at their rated current, that protector can not fully protect those devices.

One such specialized electrically-operated device is the standard electrically-operated cigar or cigarette lighter with which many automobiles are equipped. Such a lighter is designed to carry heavy currents for short periods of time, and it can do so safely; but it can destroy itself or ignite adjacent combustible materials if it is operated for prolonged periods of time at those current levels. Accordingly, it is necessary to provide a protector, in the circuit of an electrically-operated cigar or cigarette lighter, that will supply, for predetermined short periods of time, the heavy current needed by that lighter and that will thereafter open that circuit and prevent prolonged operation of that lighter. Such a protector enables the lighter to draw all of the current that it needs to function properly and yet will keep that lighter from destroying itself or igniting adjacent combustible material if that lighter is not de-energized after it has performed its function. The present invention provides such a protector for electric circuits; that protector being able to carry a predetermined current for a predetermined short period of time and being able thereafter to open the circuit to protect the circuit and the electrically-operated device therein. It is therefore an object of the present invention to provide a protector for electric circuits which will permit an electrically-operated device to draw its rated current for short periods of time but will open the circuit to protect that circuit and that device if that rated current is continued beyond a predetermined period of time.

Where, as is usually the case, the electrically-operated cigar or cigarette lighter is mounted in an automobile, its socket constitutes a ready receptacle for the male plug of a "trouble lamp," an "electric shaver" or other electrical appliance. Such appliances have electrical characteristics that are quite different from those of the electrically-operated cigar or cigarette lighter; those electrical appliances being capable of operating indefinitely on their rated currents whereas the electrically-operated cigar or cigarette lighter is not. Those electrical appliances must be protected against injury by the same protector for electric circuits that is used to protect the electrically-operated cigar or cigarette lighter, and hence the protector for electric circuits provided by the present invention must be capable of protecting electrically-operated devices having diverse electrical characteristics. It is therefore an object of the present invention to provide a protector for electric circuits that can protect electrically-operated devices having diverse electrical characteristics.

Not only must the protector for electric circuits provided by the present invention be capable of protecting an electrically-operated cigar or cigarette lighter while also being capable of protecting electrical appliances that can be plugged into the socket for that cigar or cigarette lighter, but that protector for electric circuits must be small enough to fit within the small recess at the rear of that socket. The present invention provides such a protector for electric circuits; and that protector has a short, small diameter, fusible conductor connected to one terminal of that protector, has an elongated conductor that extends between the other end of the fusible conductor and the other terminal of that protector, and has a mass of heat softenable material that normally secures the elongated conductor to said other terminal. The fusible conductor will generate heat whenever current passes through the protector for electric circuits, and that heat can be great enough to raise that conductor to its melting point. It is contemplated that some of the heat generated by the fusible conductor be conducted to the mass of heat softenable material to prevent premature fusing of that fusible conductor and also to add enough heat to the mass of heat softenable material to enable the prolonged energization of an electrically-operated cigar or cigarette lighter to soften that mass of heat softenable material. Yet, the amount of heat that the fusible conductor can be permitted to transmit to the mass of heat softenable material must be limited to enable the fusible conductor to "blow" and protect the circuit and also to keep the mass of heat softenable material from softening prematurely. The requisite limitation on the amount of heat transmitted from the fusible conductor to the mass of heat softenable material is provided by the elongated conductor that is interposed between the fusible conductor and the mass of heat softenable material. That elongated conductor will generate no appreciable heat during the operation of the protector for electric circuits, and it will radiate part of the heat it receives from the fusible conductor. In doing so, that elongated conductor limits the amount of heat that is transmitted to the mass of heat softenable material from the fusible conductor. It is therefore an object of the present invention to interpose an elongated conductor, that will generate no appreciable heat, between the fusible conductor and the mass of heat softenable material of a protector for electric circuits.

The fusible conductor and the mass of heat softenable material of the protector for electric circuits provided by the present invention are normally held in electrically conducting relation with the terminals of the protector by the elongated conductor. That conductor is biased for movement to interrupt that electrically conducting relation, but that conductor is normally held against such movement by the mass of heat softenable material. However, when the heat generated by the fusible conductor and conducted to the mass of heat softenable material by the elongated conductor plus the heat generated by the electrically-operated cigar or cigarette lighter and conducted to the mass of heat softenable material becomes great enough, the mass of heat softenable material will soften and release the elongated conductor. Thereupon that conductor will move and open the circuit through the protector.

The protector for electric circuits provided by the present invention has one terminal with an opening in the closed end thereof, and one end of the elongated conductor projects into that opening. As a result, the movable elongated conductor of the protector for electric circuits provided by the present invention can be disposed closely adjacent a terminal of the electrically-operated heat-generating device to be protected, and can directly receive heat from that device. This arrangement enables the protector for electric circuits to provide a prompt and full response to the heating of an electrically-operated cigar or cigarette lighter. It is therefore an object of the present invention to provide a protector for electric circuits which has a terminal with an opening therein and which has one end of the movable elongated conductor projecting into that opening.

The opening-equipped terminal of the protector for electric circuits provided by the present invention has a recess adjacent to, and surrounding, that opening. That recess forms a receptacle for the mass of heat softenable material used to maintain the movable elongated conductor against circuit-opening movement. It is therefore an object of the present invention to provide a protector for electric circuits with a terminal that has an opening therein and that has a recess surrounding that opening to form a receptacle for heat-softenable material.

In the protector for electric circuits provided by the present invention, the heat-softenable material is at one end of that protector, and it is essential that the said protector be disposed so the said one end thereof is adjacent the terminal of the electrically-operated cigar or cigarette lighter. The present invention makes absolutely certain that the user of the protector must dispose the said one end of the protector adjacent the terminal of the electrically-operated cigar or cigarette lighter as by providing a protuberance on the other terminal of the protector. That protuberance will prevent the disposition of that other terminal adjacent the electrically-operated cigar or cigarette lighter, and will force the user to insert the said one terminal adjacent that cigar or cigarette lighter. It is therefore an object of the present invention to provide a protector for electric circuits with a protuberance thereon that forces the user to dispose the heat-sensitive end of the protector adjacent the terminal of an electrically-operated cigar or cigarette lighter.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 1:
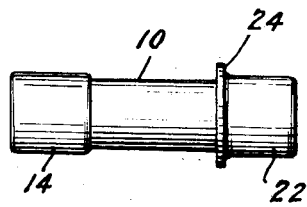
Figure 3:
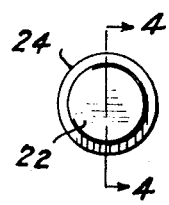
Figure 4:
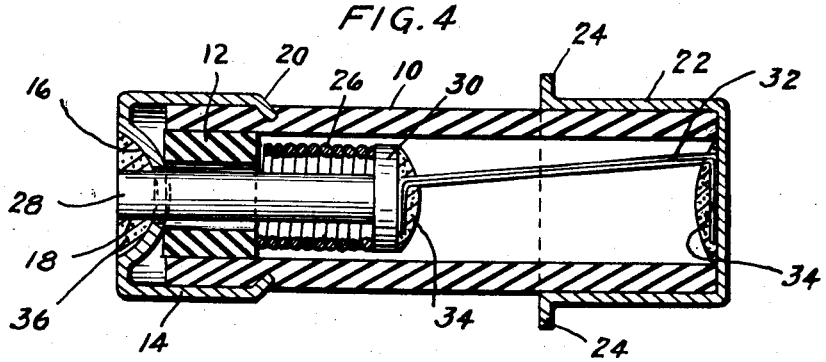
Figure 5:
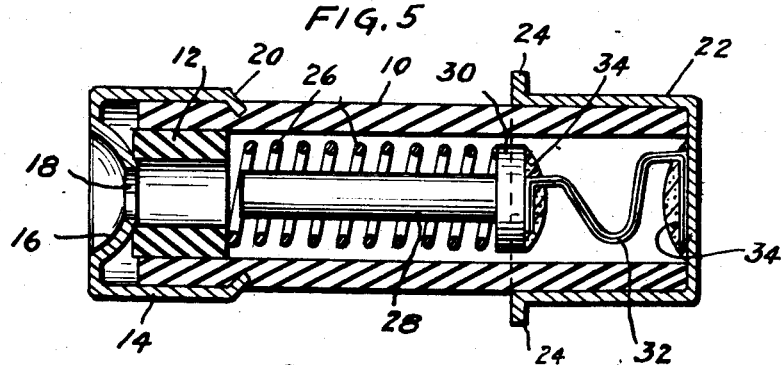
Figure 6:
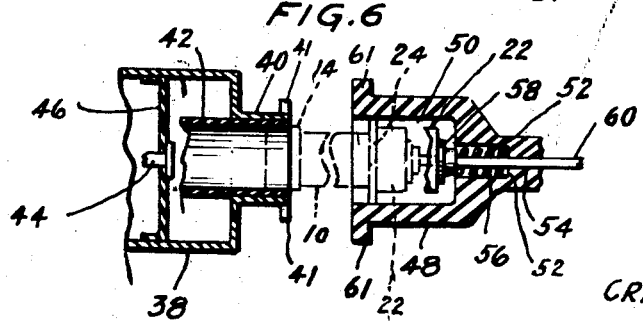

In the drawing,

Fig. 1 is a side elevational view of one form of protector for electric circuits that is made in accordance with the principles and teachings of the present invention, Fig. 2 is an end elevational view of the protector of Fig. 1, and it shows the left-hand end of that protector, Fig. 3 is an end elevational view of the protector of Fig. 1, and it shows the right-hand end of that protector, Fig. 4 is a longitudinal section, on an enlarged scale, of the protector shown in Figs. 1–3, and it is taken along the plane indicated by the line 4—4 in Fig. 3, Fig. 5 is a longitudinal section similar to the longitudinal section of Fig. 4, and it shows the protector for electric circuits after the heat softenable material has released the movable conductor to open the circuit, and Fig. 6 is a sectional view showing a part of the housing for the electrically-operated heat-generating device and showing the holder for the protector for electric circuits.

Referring to the drawing in detail, the numeral 10 denotes the tubular casing of a protector for electric circuits that is made in accordance with the principles and teachings of the present invention. That casing will preferably be of fibre or some other non-conductor of electricity. A sleeve 12 of insulation is telescoped within the left-hand end of the casing 10; and that sleeve fits loosely enough within that casing to telescope freely relative to that casing during the fabrication of the protector.

A generally cup-shaped terminal, of electrically conducting material, is denoted by the numeral 14 and that terminal has a recess 16 in the end thereof. That recess is shown as being spherical in configuration, and that configuration enables that recess to serve as a receptacle. An opening 18 is located at the center of the recess 16 and at the geometric center of the terminal 14. The terminal 14 can be suitably formed by punching operations, and it will be dimensioned so it can be telescoped over the left-hand end of the casing 10. To maintain the terminal 14 permanently in engagement with the casing 10, the free edge of the terminal is bent inwardly, as by a crimping operation; all as indicated by the numeral 20.

The numeral 22 denotes a second terminal, of electrically conducting material, that is generally cup-shaped in configuration. The free edge of the terminal 22 is rolled or otherwise flared outwardly to form a radially extending protuberance or flange 24. This flange extends radially outwardly beyond the outermost portions of the cup-like terminal 14. The terminal 22 telescopes over the right-hand end of the casing 10, and it is suitably held in engagement with that casing by staking or the like.

A helical spring 26 is formed to telescope freely within the casing 10; the outer diameters of the turns of that spring being smaller than the inner diameter of the casing 10. The inner diameters of the turns of the spring 26 are larger than the inner diameter of the sleeve 12. Consequently, the left-hand end of the spring 26 can bear against the right-hand end of the sleeve 12 of insulation. The force exerted on the sleeve 12 by the spring 26, during the assembling of the protector for electric circuits, will cause that sleeve to slide along the interior of the casing 10 until it engages and is held by the convex face of the recessed end of terminal 14.

An elongated conductor 28 is provided with a shank that has a relatively large cross section to enable that conductor to generate practically no heat when current passes through it. That shank has a diameter that is small enough to let that shank telescope into the helical spring 26, and to let the left-hand end of that shank extend into and through the opening 18 of the terminal 14. An enlarged head 30 is provided at the right-hand end of the conductor 28, and the diameter of that head is larger than the inner diameters of the turns of the spring 26. As a result, the right-hand end of the spring 26 will abut and bear against the head 30 of the conductor 28.

A relatively small cross section fusible conductor 32 extends between the head 30 of the conductor 28 and the inner face of the terminal 22. A high temperature solder 34 is used to connect the ends of the relatively small cross section fusible conductor 32 to the head 30 of the conductor 28 and to the inner face of terminal 22. The solder 34 will not fuse in the operation of the protector for electric circuits. The cross section of the fusible conductor 32 is very much less than the cross section of the shank of conductor 28, and hence the conductor 32 will generate appreciable quantities of heat as current flows through it. In fact, the conductor 32 can generate enough heat to raise itself to its fusing point and thereby fuse to open the circuit.

Low temperature heat-softenable material 36, preferably low temperature solder, fills the spherical recess 16 in the outer face of terminal 14; and that heat-softenable material will interconnect the recess 16 with the projecting end of the shank of conductor 28. That heat softenable material will normally maintain the elongated conductor 28 in electrical conducting relation with the terminal 14. However, when the heat-softenable material 36 reaches a predetermined temperature it will soften and free the conductor 28 for movement to the right, under the action of the helical spring 26. At such time the circuit through the protector will be broken.

Fig. 4 shows the normal arrangement of the components of the protector for electric circuits provided by the present invention; and when those components are so arranged, the fusible conductor 32 will conduct current from the terminal 22 to the movable conductor 28, and that conductor will then conduct that current to the terminal 14. Fig. 5 shows the protector for electric circuits after the heat-softenable material 36 has softened and has freed the movable conductor 28. When freed, that conductor was moved to the right by the force exerted by the helical compression spring 26; and in so moving, that conductor broke the circuit. Fig. 5 shows the recess 16 of terminal 14 as being completely devoid of heat-softenable material 36. Actually some, and perhaps a good part, of the heat-softenable material 36 will adhere to and continue to remain in the recess 16 of terminal 14.

The movement of the conductor 28 to the right will be quite rapid when the heat-softenable material 36 loosens its hold on that conductor. That movement is so rapid that it will break, and prevent the re-establishment of, any arc which might form as that conductor moves to the right. As the movable conductor 28 moves to the right, the fusible conductor 32 will fold or otherwise yield to permit that movement of conductor 28.

In Fig. 6, a portion 38 of the housing of the electrically-operated heat-generating device to be protected is shown, and that portion has a tubular projection 40 formed thereon. Ears 41 are provided at the right-hand end of the tubular projection 40, and those ears form part of a bayonet joint. A sleeve 42 of insulting material is disposed within the projection 40, and that sleeve extends inwardly beyond the left-hand end of that projection, as shown particularly in Fig. 6. A terminal of the electrically-operated heat-generating device to be protected is denoted by the numeral 44, and that terminal is mounted in register with the axis of the sleeve 42. In the particular embodiment shown, that terminal is held in register with the axis of the sleeve 42 by a wall of insulation 46, but it can be held in register with the axis of that sleeve by any suitable means.

The numeral 48 denotes the holder for the right-hand end of the protector for electric circuits; and that holder has a recess 50 therein. The inner diameter of the recess 50 is larger than the inner diameter of the sleeve 42 within the projection 40 on the portion 38 of the housing for the electrically-operated heat-generating device. The recess 50 has a diameter large enough to accommodate the radially-extending flange 24 on the terminal 22 of the protector, but the inner diameter of the sleeve 42 is too small to accommodate that flange. As a result, the protector for electric circuits can not have its terminal 22 telescoped into the sleeve 42 far enough to reach the terminal 44. Instead, only the terminal 14 can be telescoped through the sleeve 42 and into engagement with the terminal 44. This is very desirable because it makes certain that the heat-softenable material 36 is disposed immediately adjacent the terminal 44, and that the movable conductor 28 is interposed between the fusible conductor 32 and the terminal 44 of the electrically-operated heat-generating device.

The holder 48 has a smaller diameter recess 52 therein, and that recess is disposed to the right of, but is contiguous with, the larger diameter recess 50. The small diameter recess 52 is contiguous with a small diameter opening or passage 54 at the right-hand end of the holder 48. A helical compression spring 56 is disposed within the small diameter recess 52 in the holder 48, and a movable terminal 58 abuts the left-hand end of the spring 56. This terminal will accommodate and receive the right-hand face of the terminal 22 of the protector for electric circuits. A lead 60 is connected to the movable terminal 58, and that lead can move freely relative to the passage or opening 54 at the right-hand end of the holder 48. The holder 48 has a radially-extending flange 61 at the left-hand end thereof and that flange has recesses, not shown, which accommodate the ears 41 on the tubular projection 40. Those recesses in the flange 61 form the other part of the bayonet joint, and they cooperate with the ears 41 on projection 40 to provide selective holding of the holder 48 in engagement with the portion 38 of the housing for the electrically-operated heat-generating device.

To use the protector for electric circuits provided by the present invention, the user separates the holder 48 from the portion 38 of the housing for the electrically-operated heat-generating device and telescopes the terminal 14 of the protector for electric circuits through the sleeve 42. Thereafter, he telescopes the recess 50 of the holder 48 over the terminal 22 of the protector for electric circuits and causes the ears 41 on tubular projection 40 to engage and hold the recesses, not shown, in the flange 61 of the holder 48. As the recess 50 of the holder 48 is telescoped over the terminal 22, the terminal 58 of that holder is forced to move from the dotted line position to the solid line position in Fig. 6. The spring 56 which biases the terminal 58 to the dotted line position of Fig. 6 will yield to permit that terminal to move to the solid line position of Fig. 6; and thereafter that spring will hold the terminal 14 in electrical conducting relation with the terminal 44.

When the rated current is applied to the electrically-operated heat-generating device, that current will pass through the fusible conductor 32, through the movable conductor 28, through the heat softenable material 36, and through the terminal 44 into the heat-generating device to heat that device. Where that current is "on" for short periods only, the heat generated by the heat-generating device and transmitted to the terminal 44 will be unable to soften the heat-softenable material 36; most of that heat being absorbed and radiated by the relatively cool housing 38 and some of that heat being absorbed and radiated by the relatively cool terminal 14. The fusible conductor 32 will generate heat when the rated current is "on," but where that current is "on" for short periods only, an appreciable part of the heat will be absorbed and radiated by the relatively cool conductor 28. As a result, where the electrically-operated heat-generating device is an electrically-operated cigarette or cigar lighter, the removal of that lighter from its socket after its heating element has become red hot, and the subsequent replacing of that lighter in a non-energizing position, will enable the temperature of the heat-softenable material 36 to remain below the softening temperature of that material. However, if the cigar or cigarette lighter is not removed from its socket, or is replaced in the socket and held in energizing position, the relatively cool housing 38, terminal 14 and movable conductor 28 will be unable to absorb and radiate enough heat to remain cool—heat being added to them continuously by the cigarette or cigar lighter and by the fusible conductor. Further generation of heat by that lighter and by the fusible conductor 32 will raise the temperature of the terminal 44 of the conductor 28, and of the heat-softenable material 36 to a level at which that material will soften and release the elongated conductor 28. Thereupon the spring 26 will force the conductor 28 to the right to break the circuit. Thereafter, the heat-generating device will stop generating heat and cool off, thereby preventing its own destruction and preventing the ignition of adjacent combustible materials.

Once the protector for electric circuits has opened the circuit, it will maintain that circuit open and thereby prevent damage to the circuit or to adjacent combustible materials. When the protector for electric circuits is to be replaced, it is only necessary to separate the holder 48 from the tubular projection 40 on the portion 38 of the housing for the electrically-operated heat-generating device, and to replace the "opened" protector for electric circuits with a "closed" protector for electric circuits.

Where the protector for electric circuits is used to protect electrical appliances that have male plugs insertible in the socket for an electrically-operated cigar or cigarette lighter, the protector will not receive heat from the terminal 44. Instead, the heat that "opens" the protector for electric circuits will be generated by the flow of overload current through the fusible conductor 32. If the overload current is heavy enough, and if that current is continued for a sufficiently long time, the conductor 32 will fuse and "open" the circuit.

The protector for electric circuits provided by the present invention is thus able to protect electrically-operated heat-generating devices, and is also able to protect electrical appliances. In the former case, the heat to which the protector responds is generated by the device to be protected and by the fusible conductor, and in the latter case, the heat to which the protector responds is dominantly generated within the protector. In both cases, the elongated conductor 28 transfers heat from the fusible conductor 32 to the heat-softenable material 36 at a controlled rate.

One preferred embodiment of the present invention can "carry" fifteen amperes continuously and can "open" in five seconds at forty amperes where it is used to protect electrical appliances and will not, therefore, receive externally generated heat. Where that same protector is used to protect an electrically-operated cigar or cigarette lighter and will, therefore, receive appreciable quantities of externally generated heat, that protector will be able to "carry" a current of ten to twelve amperes for thirty seconds but will "open" if that current is continued beyond that time. Thus, where electrical appliances are to be protected, externally generated heat does not affect the "opening" of the circuit whereas externally generated heat materially affects the "opening" of the circuit when cigar or cigarette lighters are to be protected.

Whereas the drawing and accompanying description have shown and described a preferred embodiment of the present invention it should be apparent to those skilled in the art that various changes may be made in the form of the invention without affecting the scope thereof.

What I claim is:

1. A protector for electric circuits that comprises a housing, terminals of electrically conducting material thereof, a fusible conductor disposed within said housing, heat softenable material that normally maintains said fusible conductor in electrically conducting relation with said terminals, a spring within said housing adapted to respond to softening of said heat softenable material to cause said heat softenable material to release said fusible conductor from said electrically conducting relation, said heat softenable material receiving heat from said fusible conductor and being adapted to receive heat from an electrically-operated heat-generating device external of said protector, said heat from said fusible conductor being capable of raising the temperature of said heat softenable material to a point below the softening temperature of said heat softenable material and combining with a predetermined amount of heat from said external electrically-operated heat generating device to raise the temperature of said heat softenable material to said softening temperature, said fusible conductor responding to overloads to fuse and thereby open the circuit, and a conductor that is intermediate said fusible conductor and said heat softenable material, said intermediate conductor generating substantially no heat during the operation of the protector, one of said terminals being cup-shaped and having a concave recess in the end thereof, said end of said one terminal having an opening therethrough disposed within the confines of said recess, one end of said intermediate conductor extending into said opening in said end of said one terminal, said heat softenable material being disposed within said recess and holding said intermediate conductor to said one terminal to thereby hold said fusible conductor in said electrically conducting relation.

2. A protector for electric circuits that comprises a housing, terminals of electrically conducting material thereon, a fusible conductor disposed within said housing, heat softenable material that normally maintains said fusible conductor in electrically conducting relation with said terminals, a spring within said housing adapted to respond to softening of said heat softenable material to cause said heat softenable material to release said fusible conductor from said electrically conducting relation, said heat softenable material receiving heat from said fusible conductor and being adapted to receive heat from an electrically-operated heat-generating device external of said protector, said heat from said fusible conductor being capable of raising the temperature of said heat softenable material to a point below the softening temperature of said heat softenable material and combining with a predetermined amount of heat from said external electrically-operated heat generating device to raise the temperature of said heat softenable material to said softening temperature, said fusible conductor responding to overloads to fuse and thereby open the circuit, and a conductor that is intermediate said fusible conductor and said heat softenable material, said intermediate conductor generating substantially no heat during the operation of the protector, one of said terminals being cup-shaped and having an opening in the end thereof, one end of said intermediate conductor extending into said opening in said end of said one terminal, said heat softenable material being disposed at the exterior of said end of said one terminal and holding said intermediate conductor to said one terminal to thereby hold said fusible conductor in said electrically conducting relation.

3. A protector for electric circuits that comprise a housing, terminals of electrically conducting material thereon, a fusible conductor disposed within said housing, heat softenable material that normally maintains said fusible conductor in electrically conducting relation with said terminals, a spring within said housing adapted to respond to softening of said heat softenable material to cause said heat softenable material to release said fusible conductor from said electrically conducting relation, said heat softenable material receiving heat from said fusible conductor but requiring heat from an electrically-operated heat-generating device external of said protector to soften and release said fusible conductor from said electrically conducting relation, said heat from said fusible conductor being capable of raising the temperature of said heat softenable material to a point below the softening temperature of said heat softenable material and combining with a predetermined amount of heat from said external electrically-operated heat-generating device to raise the temperature of said heat softenable material to said softening temperature, said fusible conductor responding to overloads to fuse and thereby open the circuit, said fusible conductor being dimensioned to fuse and open the circuit before the heat generated therein can become great enough to itself raise the temperature of said heat softenable material to said softening temperature, and a conductor that is intermediate said fusible conductor and said heat softenable material, said intermediate conductor generating substantially no heat during the operation of the protector.

4. A protector for electric circuits that comprises a housing, terminals of electrically conducting material thereon, a fusible conductor disposed within said housing, heat softenable material that normally maintains said fusible conductor in electrically conducting relation with said terminals, and a spring within said housing adapted to respond to softening of said heat softenable material to cause said heat softenable material to release said fusible conductor from said electrically conducting relation, said heat softenable material receiving heat from said fusible conductor but requiring heat from an electrically-operated heat-generating device external of said protector to soften and release said fusible conductor from said electrically conducting relation, said heat from said fusible conductor being capable of raising the temperature of said heat softenable material to a point below the softening temperature of said heat softenable material and combining with a predetermined amount of heat from said external electrically-operated heat-generating device to raise the temperature of said heat softenable material to said softening temperature, said fusible conductor being dimensioned to fuse open the circuit before the heat generated therein can become great enough to itself raise the temperature of said heat softenable material to said softening temperature, said fusible conductor responding to overloads to fuse and thereby open the circuit.

5. A thermally responsive protector for electric circuits that comprises two elements selectively responsive to heat to open the circuit, one of said elements responding to heat generated within itself by the passage of current through said protector to open the circuit, the other of said elements requiring heat generated externally of said protector and responding to the combined effect of heat that is generated externally of said protector and is conducted to said other element and heat that is generated within the said one element and is conducted to said other element, said one element being dimensioned to open the circuit before the heat generated therein can become great enough to itself cause said other element to open the circuit.

6. A thermally responsive protector for electric circuits that comprises two elements selectively responsive to heat to open the circuit, one of said elements responding to heat generated within itself by the passage of current through said protector to open the circuit, the other of said elements requiring heat generated externally of said protector and responding to the combining effect of heat that is generated externally of said protector and is conducted to said other element and heat that is generated within the said one element and is conducted to said other element, said one element being a fusible conductor, said one element being dimensioned to open the circuit before the heat generated therein can become great enough to itself cause said other element to open the circuit.

7. A thermally responsive protector for electric circuits that comprises two elements selectively responsive to heat to open the circuit, one of said elements responding to heat generated within itself by the passage of current through said protector to open the circuit, the other of said elements requiring heat generated externally of said protector and responding to the combined effect of heat that is generated externally of said protector and is conducted to said other element and heat that is generated within the said one element and is conducted to said other element, said other element being a mass of heat softenable material, said one element being dimensioned to open the circuit before the heat generated therein can become great enough to itself cause said other element to open the circuit.

8. A thermally responsive protector for electric circuits that comprises two elements selectively responsive to heat to open the circuit, one of said elements responding to heat generated within itself by the passage of current through said protector to open the circuit, the other of said elements responding to the combined effect of heat that is generated externally of said protector and is conducted to said other element and heat that is generated within the said one element and is conducted to said other element, and a conductor that is interposed between said one and said other element and that generates substantially no heat during the operation of the protector, said one element being dimensioned to open the circuit before the heat generated therein can become great enough to itself cause said other element to open the circuit.

9. A protector for electric circuits that comprises a housing, terminals of electrically conducting material thereon, a fusible conductor disposed within said housing, heat softenable material that normally maintains said fusible conductor in electrically conducting relation with said terminals, and a spring within said housing adapted to respond to softening of said heat softenable material to cause said heat softenable material to release said fusible conductor from said electrically conducting relation, said heat softenable material receiving heat from said fusible conductor but requiring heat from an electrically-operated heat-generating device external of said protector to soften and release said fusible conductor, said heat from said fusible conductor being capable of raising the temperature of said heat softenable material to a point below the softening temperature of said heat softenable material and combining with a predetermined amount of heat from said external electrically-operated heat-generating device to raise the temperature of said heat softenable material to said softening temperature, said fusible conductor responding to overloads to fuse and thereby open the circuit, said heat softenable material being disposed at the exterior of one of said terminals so it can be placed adjacent said external electrically-operated heat-generating device.

10. A protector for electric circuits that comprises a housing, terminals of electrically conducting material thereon and two elements selectively responsive to heat to open the circuit, one of said elements responding to heat generated within itself by the passage of current through said protector to fuse and thereby open the circuit, the other of said elements requiring heat generated externally of said protector and responding to the combined effect of heat that is generated externally of said protector and is conducted to said other element and heat that is generated within the said one element and is conducted to said other element, said other element being disposed at the exterior of one of said terminals and being disposable by said one terminal adjacent the inner end of a socket in electrical-conducting and heat-transferring relation with an electrically-operated heat-generating device, said other terminal having lateral dimensions larger than the lateral dimensions of said one terminal to prevent its reaching said inner end of said socket, whereby said protector can conduct current to said device only when said one terminal is disposed in said socket.

11. A protector for electric circuits that comprises a housing, terminals of electrically conducting material thereon, a fusible conductor disposed within said housing, heat softenable material that normally maintains said fusible conductor to electrically conducting relation with said terminals, and a spring within said housing adapted to respond to softening of said heat softenable material to cause said heat softenable material to release said fusible conductor from said electrically conducting relation, said heat softenable material receiving heat from said fusible conductor and being adapted to receive heat from an electrically-operated heat-generating device external of said protector, said heat from said fusible conductor being capable of raising the temperature of said heat softenable material to a point below the softening temperature of said heat softenable material and combining with a predetermined amount of heat from said external electrically-operated heat-generating device to raise the temperature of said heat softenable material to said softening temperature, said fusible conductor responding to overloads to fuse and thereby open the circuit, said heat softenable material being disposed at the exterior of one of said terminals so it can be carried into the inner end of a socket in heat-transferring relation with said electrically-operated heat-generating device, said other terminal being formed to prevent its reaching said inner end of said socket, whereby said protector can conduct current to said device only when said one terminal is disposed in said socket.

12. A protector, for an electrically-operated heat-generating device equipped with an electrically-conducting terminal, that comprises a housing, an electrically-conducting terminal carried by said housing that can be disposed in heat-transferring and electrically-conducting relation with said electrically-conducting terminal of said device, a second electrically-conducting terminal carried by said housing, the first said housing-carried terminal having an opening therethrough, an electrical conductor disposed within said housing and having one end thereof projecting into said opening, a flexible conductor electrically connecting said electrical conductor to the second housing-carried terminal, a spring biasing said electrical conductor inwardly of said housing and away from the first said housing-carried terminal, and heat softenable material that normally engages the first said housing-carried terminal and said one end of said electrical conductor to hold said electrical conductor in electrically conducting relation with said housing-carried terminals, said protector being adapted to conduct current to said electrically-operated heat-generating device as long as said heat softenable material is below a predetermined temperature but said heat softenable material responding to heat generated by said current and to rises in the temperature of said terminal of said device to soften and release said electrical conductor so said spring can move said electrical conductor out of electrical conducting relation with the first said housing-carried terminal and thereby interrupt the circuit through said electrically-operated heat-generating device.

13. A protector, for an electrically-operated heat-generating device equipped with an electrically-conducting terminal, that comprises a housing, an electrically-conducting terminal carried by said housing that can be disposed in heat-transferring and electrically-conducting relation with said electrically-conducting terminal of said device, a second electrically-conducting terminal carried by said housing, the first said housing-carried terminal having an opening therethrough, an electrical conductor disposed within said housing and having one end thereof projecting into said opening, a flexible conductor electrically connecting said electrical conductor to the second housing-carried terminal, a spring biasing said electrical conductor inwardly of said housing and away from the first said housing-carried terminal, and heat softenable material that normally engages the first said housing-carried terminal and said one end of said electrical conductor to hold said electrical conductor in electrically conducting relation with said housing-carried terminals, said protector being adapted to conduct current to said electrically-operated heat-generating device as long as said heat softenable material is below a predetermined temperature but said heat softenable material responding to heat generated by said current and to rises in the temperature of said terminal of said device to soften and release said electrical conductor so said spring can move said electrical conductor out of electrical conducting relation with the first said housing-carried terminal and thereby interrupt the circuit through said electrically-operated heat-generating device, the first said housing-carried terminal having an external recess encompassing said opening, said heat softenable material being disposed within said recess.

14. A protector, for an electrically-operated heat-generating device equipped with an electrically-conducting terminal, that comprises a housing, an electrically-conducting terminal carried by said housing that can be disposed in heat-transferring and electrically-conducting relation with said electrically-conducting terminal of said device, a second electrically-conducting terminal carried by said housing, the first said housing-carried terminal having an opening therethrough, an electrical conductor disposed within said housing and having one end thereof projecting into said opening, a flexible conductor electrically connecting said electrical conductor to the second housing-carried terminal, a spring biasing said electrical conductor inwardly of said housing and away from the first said housing-carried terminal, and heat softenable material that normally engages the first said housing-carried terminal and said one end of said electrical conductor to hold said electrical conductor in electrically conducting relation with said housing-carried terminals, said protector being adapted to conduct current to said electrically-operated heat-generating device as long as said heat softenable material is below a predetermined temperature but said heat softenable material responding to heat generated by said current and to rises in the temperature of said terminal of said device to soften and release said electrical conductor so said spring can move said electrical conductor out of electrical conducting relation with the first said housing-carried terminal and thereby interrupt the circuit through said electrically-operated heat-generating device, said second housing-carried terminal being formed so it can not be disposed in electrical-conducting, heat-transferring relation with said terminal of said device.

References Cited in the file of this patent

UNITED STATES PATENTS

| | | |
|---|---|---|
| 2,159,423 | Bussmann | May 23, 1939 |
| 2,313,281 | Taylor | Mar. 9, 1943 |
| 2,342,310 | Taylor | Feb. 22, 1944 |
| 2,376,863 | Bussmann | May 29, 1945 |
| 2,645,690 | Edsall et al. | July 14, 1953 |
| 2,766,351 | Edsall | Oct. 9, 1956 |

FOREIGN PATENTS

| | | |
|---|---|---|
| 536,676 | Great Britain | May 22, 1941 |
| 732,837 | France | June 27, 1932 |